United States Patent
Luong et al.

(10) Patent No.: US 10,395,037 B2
(45) Date of Patent: Aug. 27, 2019

(54) SYSTEM AND METHOD FOR PRESERVING DATA DURING AN INFORMATION HANDLING SYSTEM EVENT USING INFORMATION HANDLING SYSTEM MEMORY

(71) Applicant: DELL PRODUCTS, LP, Round Rock, TX (US)

(72) Inventors: Anh Luong, Austin, TX (US); Vijay Bharat Nijhawan, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 175 days.

(21) Appl. No.: 15/490,235

(22) Filed: Apr. 18, 2017

(65) Prior Publication Data

US 2018/0300485 A1    Oct. 18, 2018

(51) Int. Cl.
*G06F 9/00* (2006.01)
*G06F 21/57* (2013.01)
*G06F 21/55* (2013.01)
*G06F 21/62* (2013.01)

(52) U.S. Cl.
CPC .......... *G06F 21/572* (2013.01); *G06F 21/554* (2013.01); *G06F 21/575* (2013.01); *G06F 21/6218* (2013.01)

(58) Field of Classification Search
None
See application file for complete search history.

(56) References Cited

U.S. PATENT DOCUMENTS

| | | | |
|---|---|---|---|
| 2003/0097510 A1* | 5/2003 | Joseph | G06F 15/7842 710/305 |
| 2007/0136565 A1 | 6/2007 | Lambrache et al. | |
| 2009/0327741 A1* | 12/2009 | Zimmer | G06F 21/575 713/183 |

OTHER PUBLICATIONS

"Platform Security Processor Protects Low Power APUs," William Wong, Electronic Design, May 7, 2014, pp. 1-3; http://electronicdesign.com/microprocessors/platform-security-processor-protects-low-power-apus.

* cited by examiner

*Primary Examiner* — Nitin C Patel
(74) *Attorney, Agent, or Firm* — Larson Newman, LLP

(57) ABSTRACT

An information handling system may include a non-volatile memory and a processor system coupled to the non-volatile memory to access the non-volatile memory. The processor system may include a processor core and a corresponding platform security processor (PSP) having PSP memory. A BIOS of the processor system running on the processor core may store data at locations in the non-volatile memory and provide these memory locations to the PSP. The PSP stores these non-volatile memory locations in PSP memory and maintains the data in the non-volatile memory at the locations during an event affecting the processor system.

20 Claims, 6 Drawing Sheets

SYSTEM AND METHOD FOR PRESERVING DATA DURING AN INFORMATION HANDLING SYSTEM EVENT USING INFORMATION HANDLING SYSTEM MEMORY

FIELD OF THE DISCLOSURE

This disclosure generally relates to information handling systems, and more particularly relates to preserving data pertaining to an information handling system during an event affecting the information handling system using information handling system memory.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a non-volatile memory and a processor system coupled to the non-volatile memory to access the non-volatile memory. The processor system may include a processor core and a corresponding platform security processor (PSP) having PSP memory. A BIOS of the processor system running on the processor core may store data at locations in the non-volatile memory and provide these memory locations to the PSP. The PSP stores these non-volatile memory locations in PSP memory and maintains the data in the non-volatile memory at the locations during an event affecting the processor system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
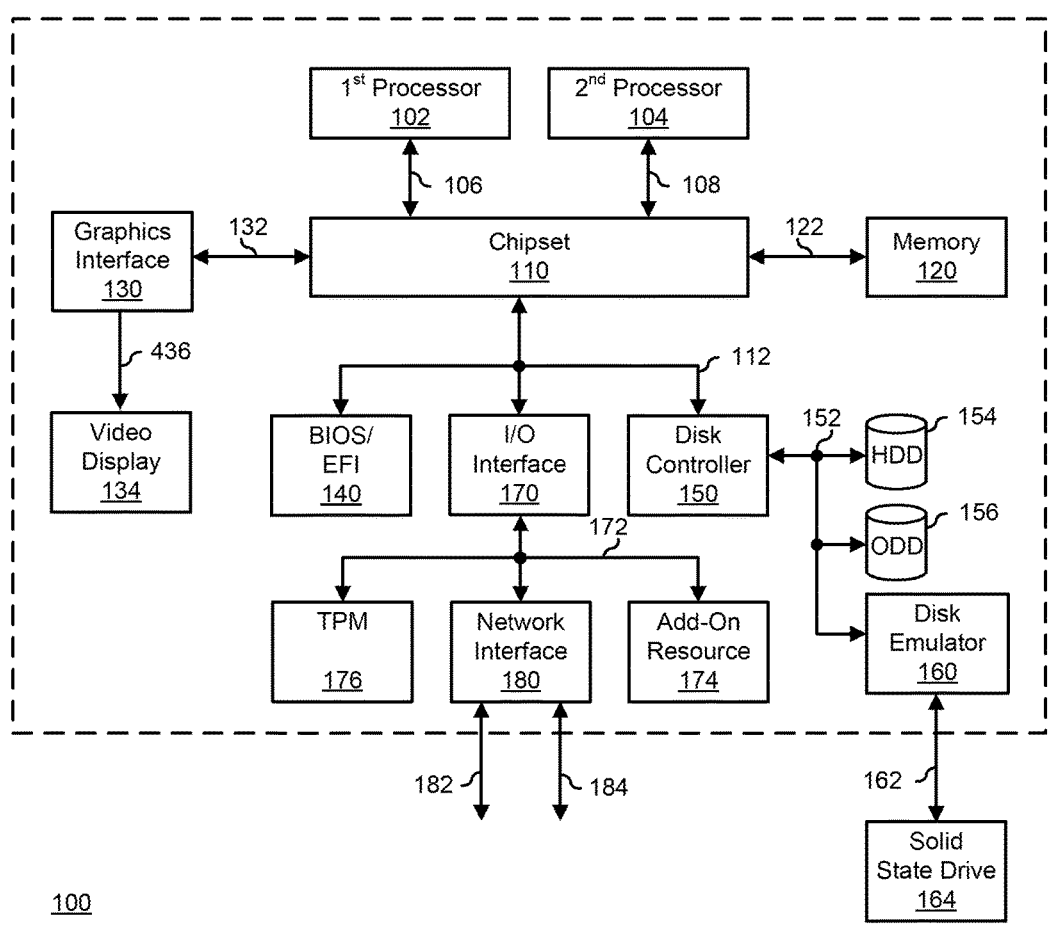
FIG. 1 is a block diagram illustrating a generalized information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a processor system which may be a System-on-a-Chip (SoC), a personal computer, a laptop computer, a smart phone, a tablet device or other consumer electronic device, storage array, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a SoC, or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to the chipset via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1394 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174, to a TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

An example of an information handling system may be a processor system with multiple processor cores and one or more associated memories with circuitry providing an interface between the same, or a SoC with multiple processor cores or dies with processor cores. A concept introduced to processor systems or SoCs is the platform security processor (PSP). A PSP is a device included in a processor system or SoC to provide security to the processor device platform. A PSP may be considered to be a processor associated with other processors which helps protect the other processors, cores, including helping manage BIOS to provide BIOS security and control. BIOS is an acronym for Basic Input/Output System. A BIOS is a type of firmware used to perform hardware initialization during the booting process on computers, and to provide runtime services for operating systems and programs. BIOS initializes and tests system hardware components and provides an abstraction layer for the hardware.

A BIOS may run on one or more processor cores of a processor system or SoC. That is, the processor cores of a processor system may host the BIOS. An individual PSP may be associated with a die having multiple processor cores and provide security to the die processor cores. In an embodiment of a processor system, the processor system may have four dies, with a respective PSP for each die such that the processor system has four PSPs, one PSP for each die. The PSPs may be connected by circuitry, and have local PSP memory, such as random access memory (RAM). The PSPs may negotiate with each other according to one or more algorithms to designate a master PSP which controls the remaining other PSPs as slave devices. In an example, each die may have eight processor cores.

Local PSP memory of a PSP may be leveraged to preserve information or data during a reboot operation involving one or more processor cores or dies of a processor system. The processor system may be associated with non-volatile main or host memory. This non-volatile memory may be on the processor system or off the processor system. That is, if the processor system is a SoC, for example, the non-volatile memory may be located external to the SoC, for example, may be hard drive memory or flash memory coupled for access by the processor system, and processor cores of the processor system. In embodiments, the non-volatile memory may store a copy of the BIOS, for example, an updated BIOS copy which has been updated with BIOS updates.

In embodiments, the PSP memory may be leveraged to preserve data by storing data that might be stored in processor registers or other data, or storing memory locations of non-volatile memory to be preserved during a reboot of a processor system. For example, a PSP and corresponding PSP memory may be leveraged to store memory locations of non-volatile memory to be preserved during a reboot of a processor system by a BIOS running on the processor system sending a message or command to a PSP indicating data in non-volatile memory should be preserved. In response to the message or command from the BIOS, the PSP stores memory locations in non-volatile memory corresponding to the data to be preserved in local PSP memory, and preserves data stored at these memory locations in non-volatile memory.

Figure 2:
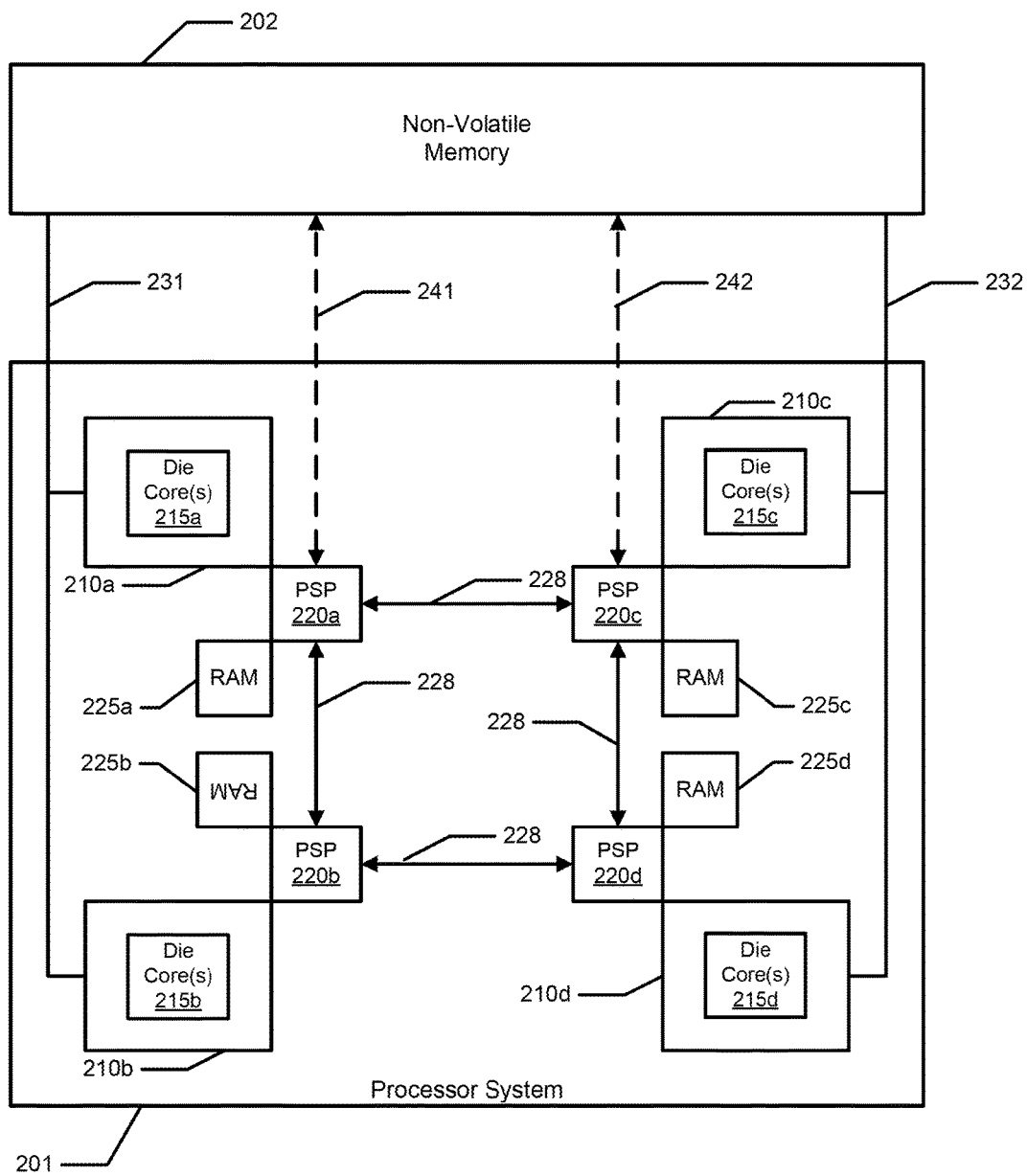
FIG. 2 illustrates an information handling system including a processor system according to an embodiment of the present disclosure.

FIG. 2 shows an information handling system 200 including a processor system 201 coupled to a non-volatile memory 202 that may serve as main memory for processor system 201. Processor system 201 may be a SoC or may be a processor. Non-volatile memory 202 may be solid state memory, for example, may be a solid-state memory device, or may be disk memory or other type of non-volatile memory. As can be seen from FIG. 2, non-volatile memory 202 may be external to processor system 201. Processor system 201 may be coupled by one or more busses to non-volatile memory 202 to access non-volatile memory 202.

Processor system 201 may include four processor dies 210a-210d and four corresponding PSPs 220a-220d. That is, PSP 220a corresponds to processor die 210a, etc. Processor dies 210a-210d may each include a set of eight processor cores 215a-215d, etc. That is, processor die 210a includes a set of eight processor cores shown as 215a, etc. PSPs 220a-220d include respective and corresponding PSP memories 225a-225d and are connected to access PSP memories 225a-225d. That is, PSP 220a includes PSP memory 225a and may access PSP memory 225a to store data or read data stored in PSP memory 225a, etc.

PSPs 220a-220d are connected by circuitry 228. In operation of processor system 201, PSPs 220a-220d may negotiate among each other to designate a master PSP which may then interface with the other PSPs as slave devices. In operation of processor system 201, a BIOS running on processor system 201 or hosted by processor system 201 may interface, for example, communicate, with the PSPs, for example, the designated master PSP. The BIOS may run on processor dies 210a-210d, and more particularly on one or more processor cores of processor cores 215a-215d. The BIOS may issue or send one or more commands to the PSPs, for example, by sending one or more commands to the designated master PSP. The master PSP may then delegate or distribute tasks to other PSPs.

The processor cores 251a-215d of processor dies 210a-210d, and thus the BIOS, may be connected to non-volatile memory 202 to access non-volatile memory 202 over busses 231 and 232. PSPs 220a-220d may be connected to non-volatile memory 202 to access non-volatile memory 202 over busses 241 and 242. Busses 231, 232, 241, and 242 may be parts of the same bus or different busses connecting processor system 201 to non-volatile memory 202.

The BIOS may send commands to the PSPs to preserve data. For example, the BIOS may send data to be preserved in PSP memory to one or more PSPs, such as the designated master PSP. Or one or more PSPs may collect data to be preserved in response to commands from the BIOS. For example, the BIOS may send data to the master PSP to be preserved or may send commands specifying the PSPs access and store data. PSP memories 225a-225d may be amalgamated, by the master PSP for example, and may be used by a PSP to store data based on one or more commands from the BIOS to a PSP of PSPs 220a-220d.

For example, to amalgamate PSP memories to store data, the master PSP may first send messages to other PSPs through PSP interconnect bus 228 to allocate certain amount of memory in their DRAMs, for example. Once the master PSP receives acknowledgement from other PSPs that they have allocated memory, the Master PSP will transfer the data to other PSPs through the PSP interconnect bus 228 to save data in their DRAMs.

PSP memories 225a-225d may thus be leveraged to store or preserve data during reboots of different degrees of processor system 201. For example, reboots of varying degrees may be effected across one or more of processor cores 215a-215d and processor system 201 generally. During reboots of processor system 201, PSP memories 225a-225d may store data to be preserved or indications of data to be preserved.

In an embodiment, register data of processor system 201, such as register data of processor cores 215a-215d, or a broader set of register data that would over flow registers of processor system 201, or a full set of debug data such as log data may be preserved in PSP memories 225a-225d by the BIOS running on processor system 201 based upon one or more stimuli, for example, initiation of a reboot. For example, in response to initiation of a reboot, the BIOS may send the data to be saved in PSP memories 225a-225d to a PSP of PSPs 220a-220d to save the received data to be saved in PSP memories 225a-225d. For example, in response to stimulus, the BIOS may send one or more commands to one or more PSPs of PSPs 220a-220d commanding that the PSPs access register or debug data on processor system 201 and store the data in PSP memories 225a-225d.

Figure 3:
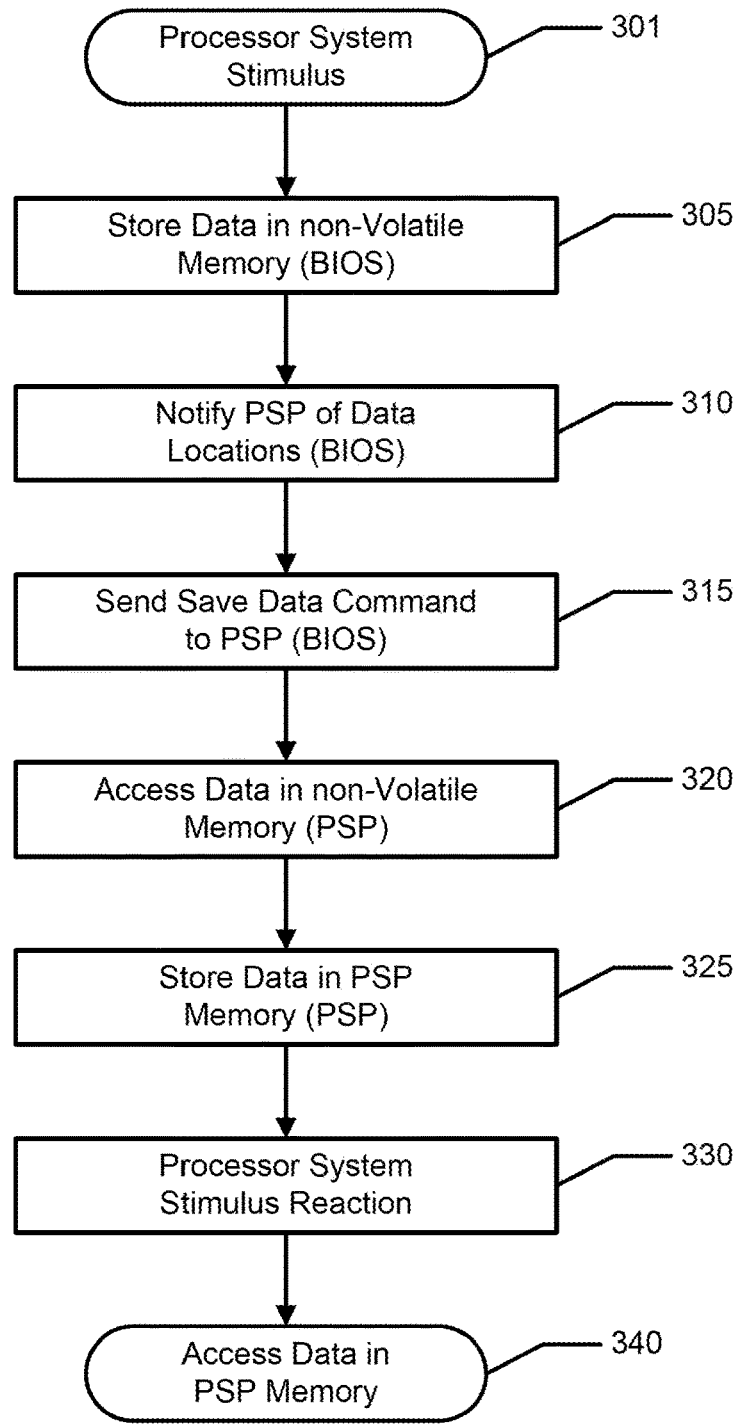
FIG. 3 illustrates using information handling system memory to preserve data according to an embodiment of the present disclosure.

FIG. 3 shows an example embodiment 300 of leveraging PSP memories, for example memories 225a-225d, to store or preserve data, and will be discussed with reference to FIG. 2. Embodiment 300 begins at 301 with a stimulus to processor system 201. For example, the stimulus may be initiation of a reboot to processor system 201, or may be an event with regard to processor system 201 that indicates a reboot of a degree will occur with regard to processor system 201. At 305, in response to the stimulus, the BIOS running on processor system 201 stores data to be preserved in non-volatile memory 202 at one or more locations. This data stored in non-volatile memory 202 at one or more locations may be debug data, for example, related to the stimulus of 301, or may be register data from processor system 201, or may be overflow diagnosis data such as log data generated by processor system 201 regarding one or more components and operations of processor system 201.

At 310, the BIOS notifies a PSP of PSPs 220a-220d of the one or more locations of non-volatile memory 202 storing the data to be preserved. For example, the BIOS may send the memory addresses of memory locations storing the data to be preserved to the PSP. At 315, the BIOS sends a save data command to a PSP of PSPs 220a-220d. The save data command indicates to the PSP that the PSP is to save the data in the memory locations provided by the BIOS at 310. As would be understood by one of skill in the art, 310 and 315 may occur concurrently as the same command from BIOS to PSP. For example, the save data command could include the memory addresses of memory locations storing the data to be preserved.

At 320, a PSP of PSPs 220a-220d accesses non-volatile memory 202 and reads the data to be preserved from the memory locations in non-volatile memory 202 provided to the PSPs at 310. For example, the designated master PSP may read the data to be preserved from the memory locations in non-volatile memory 202. At 325, a PSP of PSPs 220a-220d stores the data to be preserved in memory provided by PSP memories 225a-225d. The master PSP may delegate this task to an other PSP to have the other PSP use its PSP memory. At 330, processor system 201 under goes a reaction to the stimulus. For example, processor system 201 may undergo a warm reboot of a degree. At 340, the data stored and thus preserved in PSP memory at 325 is accessed. For example, a PSP may access PSP memories and read the preserved data responsive to a BIOS command. The PSP may then provide the data to the BIOS.

While embodiment 300 illustrates using non-volatile memory 202 as intermediate data storage for transferring data to be preserved to a PSP, a PSP may directly obtain the data from registers or other processor system components.

Figure 4:
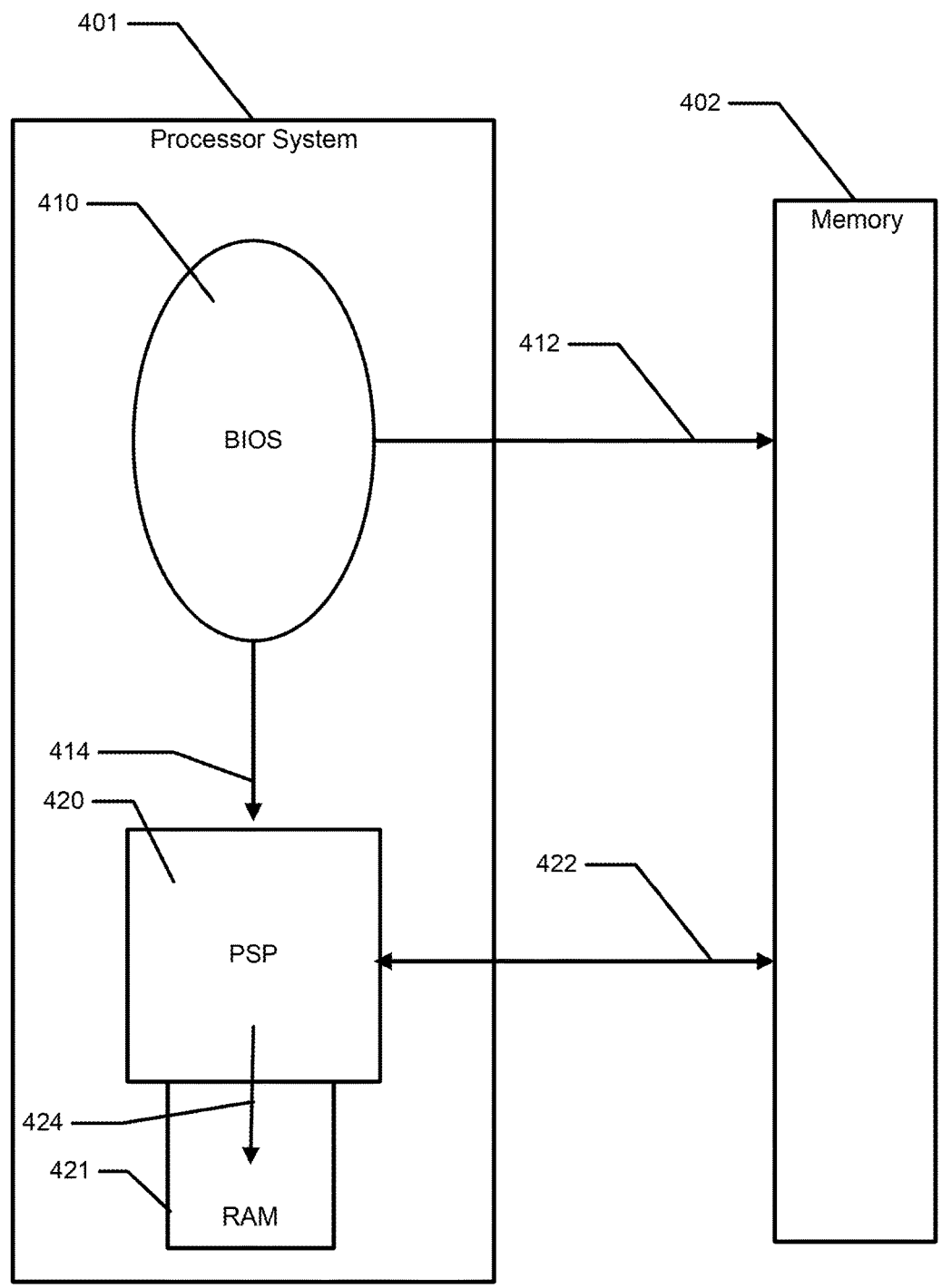
FIG. 4 illustrates an information handling system including a processor system and operations of the information handling system according to an embodiment of the present disclosure.

FIG. 4 shows a logical representation of an information handling system 400 and memory preservation operations of information handling system 400. Information handling system 400 includes a processor system 401 and a non-volatile memory 402 that may be accessed by processor system 401. Processor system 401 includes one or more processor cores (not shown) and a BIOS 410 running on the processor core(s). Processor system 401 further includes PSP 420 and PSP memory 421. That is PSP 420 includes PSP memory 421 which may be RAM memory and is accessible by PSP 420 for data storage.

In a set of memory preservation operations (412, 414, 422, 424), data is stored and preserved in PSP memory 421. In response to a stimulus, BIOS 410 stores data generated by processor system 401, such as log data, at memory locations in non-volatile memory 402 in memory storage operation 412. In PSP command operation 414, BIOS 410 communicates with PSP 420, providing a save data command to PSP 420 and indicates the locations in non-volatile memory 402 where the data to be preserved is stored. In obtain data operation 422, PSP 420 accesses non-volatile memory 402 and reads the data stored in the memory locations provided to PSP 420 by BIOS 410 in operation 422. In save operation 424, PSP 420 stores the data read from non-volatile memory 402 in PSP memory 421, thereby preserving data in PSP memory 421. The preserved data may later be accessed in PSP memory 421.

Referring to FIG. 2, in an embodiment, in response to one or more stimuli, such as initiation of one or more reboots or types of reboots to processor system 201, the BIOS running on processor system 201 may send a memory preserve command to one or more PSPs of PSPs 220a-220d requiring that the PSPs preserve portions or sections of non-volatile memory 202. The memory preserve command may be associated with, for example, indications of the memory portions to be preserved. For example, the memory preserve command may include the addresses of non-volatile memory to be preserved.

In response to receiving the memory preserve command from the BIOS, which may include the addresses of the non-volatile memory 202 to be preserved, a PSP stores the addresses of the non-volatile memory 202 to be preserved in local PSP memory, namely memory provided by PSP memories 225a-225d. The addresses to be preserved per the memory preserve command from the BIOS may be stored in a preserve memory table in PSP memory, and PSPs 220a-220d operate to preserve the memory locations of non-volatile memory 202 in the preserve memory table during one or more reboot operation of processor system 201, for example.

Figure 5:
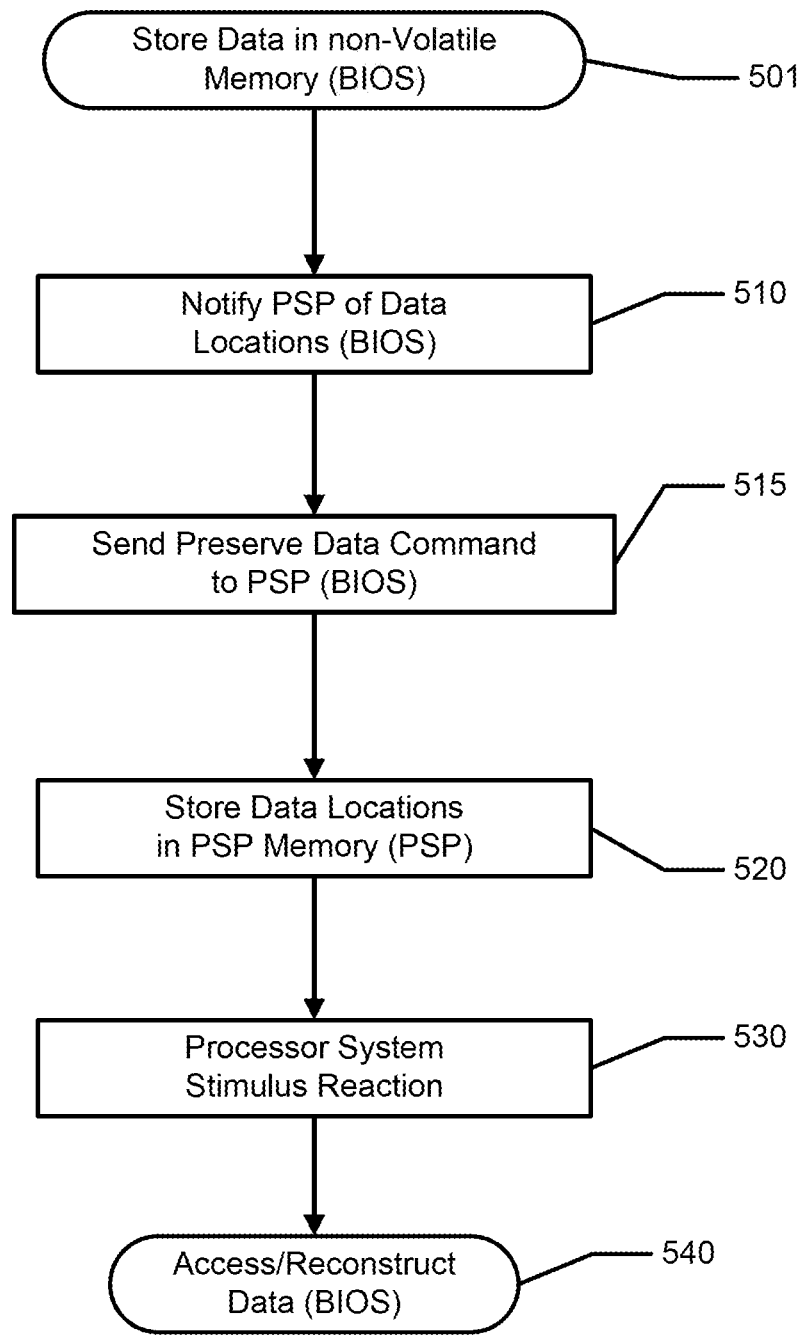
FIG. 5 illustrates using information handling system memory to preserve data according to an embodiment of the present disclosure.

FIG. 5 shows an example embodiment 500 of leveraging PSP memories, for example memories 225a-225d, to store or preserve data in non-volatile memory such as memory 202, and will be discussed with reference to FIG. 2. At 501, the BIOS running on processor system 201 stores data to be preserved in non-volatile memory 202 at one or more locations which may be designated or identified by corresponding memory addresses indicating or corresponding to the locations. This data stored in non-volatile memory 202 at one or more locations may be BIOS related data, such as a BIOS image, BIOS updates, or an updated BIOS image. The BIOS image may be considered a static copy of the BIOS, that is, BIOS firmware that when executed instantiates the BIOS. One or more stimuli with regard to processor system 201 may have occurred prior to, concurrent with or subsequent to 501, such as an event triggering a reboot of processor system 201. An example of such an event may be a BIOS update event such as a BIOS update to be performed with regard to processor system 201 and the BIOS running on processor system 201.

At 510, the BIOS notifies a PSP of PSPs 220a-220d of the one or more locations of non-volatile memory 202 to be preserved to thereby preserve the data stored at those memory locations of non-volatile memory 202. For example, the BIOS may send the memory addresses of memory locations storing the data to be preserved to the PSP. At 515, the BIOS sends a preserve data command to a PSP of PSPs 220a-220d. The preserve data command indicates to the PSP that the PSP is to save the memory locations or addresses provided by the BIOS at 510. As would be understood by one of skill in the art, 510 and 515 may occur concurrently as the same command from BIOS to PSP. For example, the preserve data command sent to and received by the PSP could include the memory addresses of memory locations to be preserved.

At 520, a PSP of PSPs 220a-220d stores the memory locations (for example, memory addresses) of non-volatile memory 202 storing data to be preserved in memory provided by PSP memories 225a-225d. At 530, processor system 201 undergoes a reaction to a stimulus with regard to processor system 201, for example, the BIOS update event discussed above. Processor system 201 may undergo a warm reboot of a degree in response to the stimulus, for example. During the reaction of processor system 201, a PSP of PSPs 220a-220d maintains the data in the non-volatile memory 202 at the memory locations stored in PSP memories 225a-225d in response to the preserve data command, thereby preserving the data stored at the specified memory locations.

At 540, the data preserved in non-volatile memory 202 may be accessed, and may be reconstructed. For example, a BIOS update may be reconstructed from the data preserved in non-volatile memory 202 by the preserve data command. The memory locations in non-volatile memory 202 may be accessed using the corresponding memory locations stored in PSP memories 225a-225d. For example, a BIOS running on processor system 201 subsequent to the reaction at 530 may query a PSP of PSPs 220a-220d for the memory locations stored in PSP memories 225a-225d, and the PSP may read the memory locations from PSP memories 225a-225d and provide the memory locations to the BIOS. The BIOS may then access those memory locations in non-volatile memory 202 to obtain the preserved data stored at those memory locations. The BIOS may reconstruct the stored data, for example, into a BIOS update.

Figure 6:
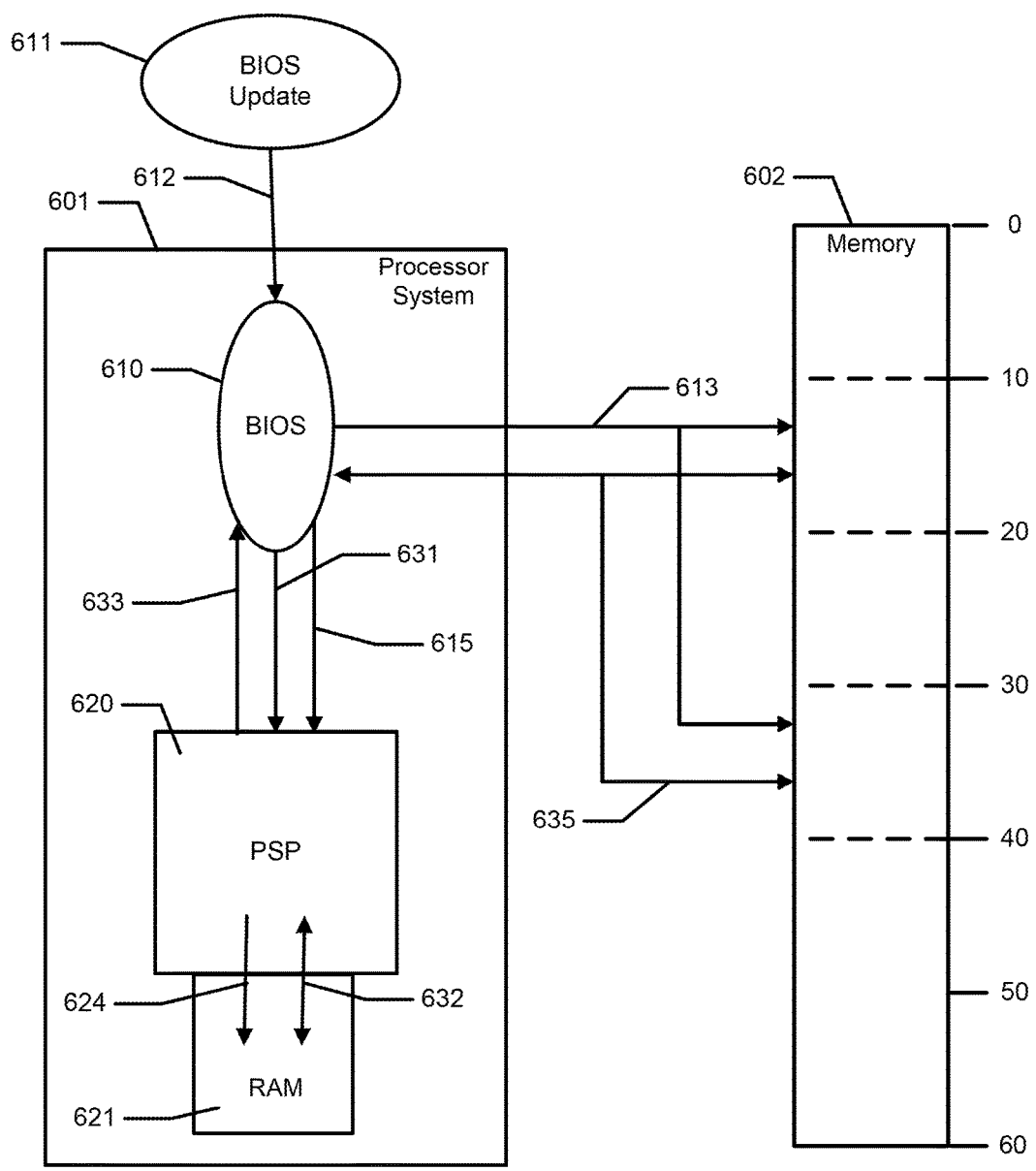
FIG. 6 illustrates an information handling system including a processor system and operations of the information handling system according to an embodiment of the present disclosure.

FIG. 6 shows a logical representation of an information handling system 600 and memory preservation operations of information handling system 600. Information handling system 600 includes a processor system 601 and a non-volatile memory 602 which may be accessed by processor system 601. Processor system 601 includes one or more processor cores (not shown) and a BIOS 610 running on the processor core(s). Processor system 601 further includes PSP 620 and PSP memory 621. That is PSP 620 includes PSP memory 621 which may be RAM memory and is accessible by PSP 620 for data storage.

A BIOS update 611 may be provided for processor system 601 to update BIOS 610 running on processor system 601. Firmware that when run by one or more processor cores of processor system 601 instantiates BIOS 610 may be stored in a ROM (not shown) of processor system 601, and BIOS 610 may update this firmware by performing a flash operation to write updated data, firmware, or commands to the ROM to thereby update the BIOS.

In a set of memory preservation operations (612, 613, 615, 624, 631, 632, 633, 635), data may be preserved in non-volatile memory 202. In response to the provision of BIOS update 611 to BIOS 610 in update operation 612, BIOS 610 stores BIOS update 611 data in non-volatile memory 602 at addresses 10-20 and addresses 30-40 in memory storage operation 613. In command operation 615, BIOS 610 communicates with PSP 620, providing a preserve data command to PSP 620 and providing the addresses 10-20 and 30-40 in non-volatile memory 402 where the BIOS data to be preserved is stored. PSP 620 stores the non-volatile memory addresses 10-20 and 30-40 in a table (not shown) in PSP memory 621 in address store operation 624.

Subsequent to initiation of a reset of a degree with regard to processor system 601, PSP 620 preserves the data in non-volatile memory addresses 10-20 and 30-40 as instructed by the preserve data command received from BIOS 610. PSP 620 may clear other memory portions of non-volatile memory 602 exclusive of non-volatile memory addresses 10-20 and 30-40, or may clear pointers to non-volatile memory 602 unrelated to non-volatile memory addresses 10-20 and 30-40. Thus, data, namely the BIOS update data stored at non-volatile memory addresses 10-20 and 30-40 of non-volatile memory 602 will be preserved by PSP during the reset of processor system 601, and will be available and valid for use subsequent to the reset of processor system 601.

The PSP knows how to translate memory addresses to memory channel/bank/rank and the PSP may train the whole system memory except for those, thus preserving the desired data. The PSP can choose to skip memory training and instead preserve memory content.

Operations 631, 632, 633, 635 may occur subsequent to the reset of processor system 601.

In query operation 631, BIOS 610 queries PSP 620 for the addresses in non-volatile memory 602 storing BIOS update data. In turn, in return operation 632, PSP 620 accesses PSP memory 621 and reads the addresses in non-volatile memory 602 storing BIOS update data, namely addresses 10-20 and 30-40. PSP 620 then provides these addresses to BIOS 610 in operation 633. In operation 635, BIOS 610 accesses non-volatile memory 602 and reads the BIOS data stored in memory addresses 10-20 and 30-40. Then BIOS 610 reconstructs BIOS update data from the BIOS data read from memory addresses 10-20 and 30-40 and flashes the reconstructed BIOS update data to processor system 601 ROM memory to update the BIOS data stored in the ROM.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
a non-volatile memory; and
a processor system coupled to the non-volatile memory to access the non-volatile memory, the processor system including a processor core and a corresponding platform security processor (PSP) having a PSP memory, wherein a BIOS of the processor system running on the processor core stores data to be preserved in response to a stimulus at memory addresses in the non-volatile memory, provides the memory addresses to the PSP, and provides a preserve memory command, and the PSP stores the memory addresses in the PSP memory and maintains the data in the non-volatile memory at the memory addresses during the stimulus affecting the processor system.

2. The information handling system of claim 1, wherein the stimulus is a reboot affecting the processor core.

3. The information handling system of claim 1, wherein the BIOS provides the preserve memory command to the PSP with regard to the memory addresses.

4. The information handling system of claim 1, wherein the stimulus is associated with a BIOS update to the BIOS.

5. The information handling system of claim 1, wherein the BIOS requests the memory addresses from the PSP subsequent to the stimulus, the PSP obtains the memory addresses from the PSP memory and the PSP provides the memory addresses to the BIOS.

6. The information handling system of claim 5, wherein the BIOS accesses the data at the memory addresses.

7. The information handling system of claim 6, wherein the BIOS reconstructs a BIOS update from the data.

8. The information handling system of claim 7, wherein the BIOS updates a processor system memory storing BIOS firmware with the BIOS update.

9. The information handling system of claim 1, wherein the data is derived from a BIOS update received by the BIOS.

10. The information handling system of claim 1, further comprising a further PSP memory, wherein the PSP memory and the further PSP memory are amalgamated to provide increased memory capacity.

11. A processor system coupled to a non-volatile memory to access the non-volatile memory, the processor system comprising:
- a die providing a set of processor cores including a processor core; and
- a platform security processor (PSP) corresponding to the die and having a PSP memory, wherein a BIOS of the processor system running on the processor core stores data to be preserved in response to a stimulus at multiple memory addresses in the non-volatile memory and provides the multiple memory addresses to the PSP, sends a preserve memory command to the PSP to cause the PSP to preserve data stored at the multiple memory addresses during the stimulus, and the PSP stores the multiple memory addresses in the PSP memory and maintains the data in the non-volatile memory at the multiple memory addresses during the stimulus affecting the processor system.

12. The processor system of claim 11, wherein the stimulus occurred before the BIOS stores data to be preserved.

13. The processor system of claim 11, wherein the BIOS requests the multiple memory addresses from the PSP subsequent to the stimulus, the PSP obtains the multiple memory addresses from the PSP memory and the PSP provides the multiple memory addresses to the BIOS.

14. The processor system of claim 13, wherein the BIOS accesses the data at the multiple memory addresses.

15. The processor system of claim 14, wherein the data is derived from a BIOS update received by the BIOS.

16. The processor system of claim 15, wherein the BIOS reconstructs the BIOS update from the data.

17. The processor system of claim 16, wherein the BIOS updates a processor system memory storing BIOS firmware with the BIOS update.

18. A method performed in a processor system hosting a BIOS and including a platform security processor (PSP) with a PSP memory, the method comprising:
- storing data to be preserved in response to an event at multiple locations identified by memory addresses in a non-volatile memory accessible by the processor system;
- providing the multiple locations to the PSP by the BIOS;
- sending a preserve memory command to the PSP from the BIOS;
- storing the multiple locations in the PSP memory by the PSP prior to the event affecting the processor system; and
- during the event, preserving data storing at the multiple locations by the PSP.

19. The method of claim 18, further comprising accessing the PSP memory to obtain the multiple locations from PSP memory by the PSP subsequent to the event and providing the multiple locations to the BIOS.

20. The method of claim 19, further comprising reconstructing a BIOS update from the data by the BIOS.

* * * * *